US005786012A

United States Patent [19]

Peterson

[11] Patent Number: 5,786,012
[45] Date of Patent: Jul. 28, 1998

[54] METHOD OF ADDING VITAMIN CONCENTRATES TO DIARY PRODUCTS

[75] Inventor: Erik G. Peterson, Crown Point, Ind.

[73] Assignee: Vitamins, Inc., Chicago, Ill.

[21] Appl. No.: 763,800

[22] Filed: Dec. 11, 1996

[51] Int. Cl.$^6$ .................................................... A23L 2/00
[52] U.S. Cl. ........................................... 426/231; 426/72
[58] Field of Search ........................ 426/231, 72; 99/452, 99/534; 222/255

[56] References Cited

U.S. PATENT DOCUMENTS

| | | | |
|---|---|---|---|
| 3,768,510 | 10/1973 | Reves | 137/551 |
| 4,152,936 | 5/1979 | Boykin et al. | 73/198 |
| 4,940,976 | 7/1990 | Gastouniotis et al. | 340/870.02 |
| 4,951,224 | 8/1990 | Hokynar | 364/510 |
| 4,993,365 | 2/1991 | Weerstra | 119/71 |
| 5,068,116 | 11/1991 | Gibney et al. | 426/231 |
| 5,108,268 | 4/1992 | Divall | 417/269 |
| 5,143,257 | 9/1992 | Austin et al. | 222/57 |
| 5,333,498 | 8/1994 | Brackett et al. | 73/198 |
| 5,344,044 | 9/1994 | Hayden et al. | 222/1 |

OTHER PUBLICATIONS

Haddad, J.G., "Vitamin D—Solar Rays, the Milky Way, or Both?," *The New England Journal of Medicine*, vol.326, No. 18, pp. 1213–1215, Apr. 30, 1992.

"Dairy Found Negligent in Fatal Vitamin D OD," The Boston Herald, Jun. 24, 1993.

Scanlon, K.S. et al., "Subclinical Health Effects in a Population Exposed to Excess Vitamin D in Milk," *American Journal of Public Health*, vol. 85, No. 10, pp. 1418–1422.

Jacobus, C.H. et al., "Hypervitaminosis D Associated with Drinking Milk," *The New England Journal of Medicine*, vol. 326, No. 18, pp. 1173–1177, Apr. 30, 1992.

*Primary Examiner*—George Yeung
*Attorney, Agent, or Firm*—Mark J. Murphy; Donald E. Egan

[57] ABSTRACT

A vitamin concentrate delivery system including a positive displacement pump having a pump drive and a pump controller, and a flow measurement or detection unit having a magnetic flow tube, a transmitter and a recording device to regulate the flow of liquid vitamin concentrates into food products. A method of adding the vitamin concentrates to the dairy products is also described.

3 Claims, 1 Drawing Sheet

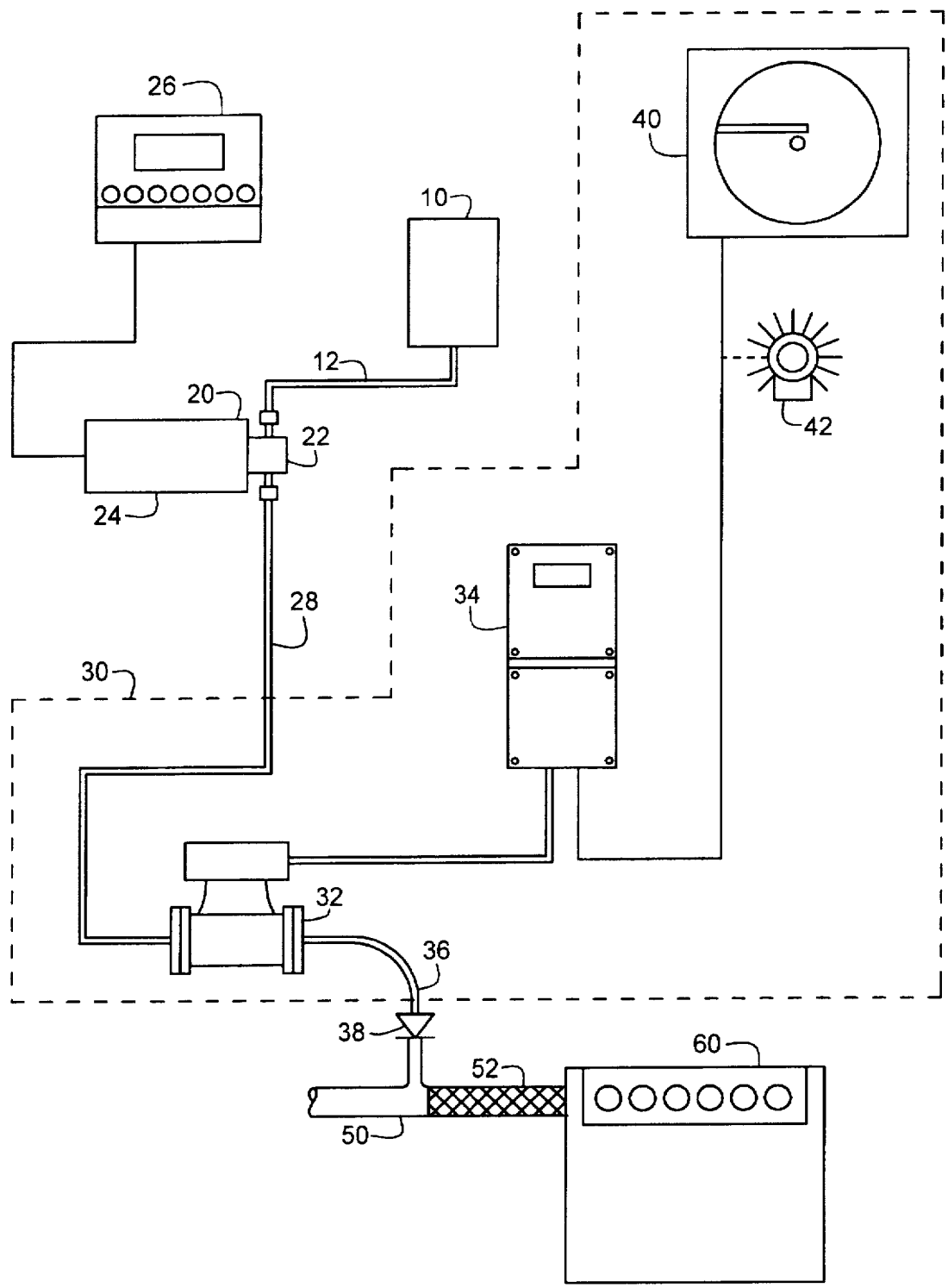

METHOD OF ADDING VITAMIN CONCENTRATES TO DIARY PRODUCTS

The present invention relates to a vitamin concentrate delivery system, and particularly a delivery system adapted to provide vitamin concentrates to dairy products such as milk.

The delivery system of the present invention combines a positive displacement pump and a flowmeter, preferably a magnetic flow tube, in order to accurately control and monitor the volume of vitamin concentrate provided to the product, while recording the volume of vitamin concentrate pumped and the rate at which the concentrate is introduced into the product. A method of adding the vitamin concentrates to dairy products is also described.

BACKGROUND OF THE INVENTION

In the process by which milk and other dairy products are fortified with vitamins, it is extremely important to accurately regulate the quantity of vitamin concentrates added to the milk. Failure to maintain vitamin concentrate delivery at the proper level has untold effects irrespective of whether the vitamin concentrate delivered is above or below the specified range. Recent well-publicized cases have illustrated the risks of overfortification. For example, vitamin D intoxication or hypervitaminosis D is caused by excessive vitamin fortification of diary milk. Dr. Jacobus, et al., "Hypervitaminosis D Associated With Drinking Milk", *The New England Journal of Medicine* (Apr. 30, 1992). Other problems include hypercalcemia, hypercalciuria, urinary tract stones, extraskeletal calcifications and malfunctions of the kidneys and other organs. As a result, the operation of dairy vitamin concentrate addition is under increasing regulatory scrutiny.

Current vitamin delivery systems possess several inherent weaknesses including: imprecise control, difficulty of calibration, incompatibility with equipment sanitation operations, inadequate backpressure resistance, and lack of independent automatic verification of volume pumped, among others.

Prior delivery systems have, until recently, been quite difficult to calibrate and adjust flow rates. The typical calibration procedure involved repeated mechanical adjustments to match a desired pumping rate. More recent models have incorporated digital controls of greater sophistication which greatly simplify the calibration and operation of the equipment, and permit interfaces with computerized control systems. These models feature variable-speed motors with keypad controllers, which permit one-touch operation and screens which display either flowrate or total volume pumped. The delivery system of the present invention utilizes this type of control apparatus.

Many of these more sophisticated prior devices, however, rely on a peristaltic or "tubing" pump mechanism for product delivery due to its simplicity and relatively low initial cost. This type of pump uses sequential compression of a light, flexible hose to move the product fluid by peristalsis. These hoses tend to wear out rapidly under this constant flexure, requiring frequent replacement. The required hose flexibility also restricts peristaltic pumps to use in systems with static pressure no higher than 25 psig, obviating their use in higher-pressure systems since the tubing will swell or burst under those conditions.

In contrast, the most commonly used pumps which can operate in high-pressure systems feature a ceramic piston to pump the vitamin concentrate, but do not typically offer the automated features required for simple and precise operation and control. No system has previously been used which combines easy operation and control with the pressure-handling capabilities of a piston pump.

Electrical components, particularly the motors and controllers, of prior delivery systems are also susceptible to the wet environment found in all dairy plants. Due to the need for absolutely sanitary conditions in processing fluid milk products, the plant areas are frequently and thoroughly sprayed with water mixed with sanitizing solution. Unless special accommodations are made, the majority of units in current use will fail when subjected to these conditions, requiring replacement of motors, controllers, or both. The typical solution has been either to dismantle and remove the system prior to washdown or to encase the pumps in a costly, inconvenient waterproof enclosure.

Additionally, prior delivery systems are by and large not compatible with either computers or standard control systems.

Further, prior art delivery systems do not provide independent verification of pumped volumes. Developing regulations require monitoring and recording of actual vitamin volumes used for fortification in light of several cases of injury in which milk was improperly fortified. Some prior art systems utilize a "metering" monitor/totalizer which senses the number of revolutions (per minute and total) made by the pump drive motor. This approach is susceptible to errors of several type in several locations including in the tubing (broken or burst), in the calibration (discrepancy between pump drive RPM and volume), or if there is a lack of product or air pockets in the lines. Any of these can result in faulty volume readings due to the strict dependence on the reliability of the drive and upstream components. Independent verification of flow resolves these issues of uncertainty. Furthermore, prior vitamin delivery systems do not provide a simple, accurate, precise method of documenting volumes of vitamins pumped. Documentation will be essential to meeting increasingly stringent regulations requiring fortification traceability and verification.

The vitamin concentrate delivery system of the present invention overcomes all of the foregoing problems. The pump itself is driven by a variable-speed motor connected to a digital electronic controller operated through a digital keypad. The pump system is calibrated by a simple, one-step procedure which is prompted by the controller. The digital controller/variable speed pump drive system also simplifies flow rate adjustment.

The system of present invention features a ceramic piston pumping mechanism. This allows utilization of higher-grade tubing and high pressure pumping of the vitamin concentrate as required. This type of mechanism delivers a fixed volume of product per piston cycle (stroke) and is negligibly affected by variations in fluid viscosity.

The pump, controller, flow sensor, and flow transmitter of the present invention are built to NEMA-4 (waterproof) standards and are thereby impervious to water and cleaning materials. This provides for safe and reliable setup, maintenance, and repair of the system despite the daily sanitation activities in the plant. The pump flowmeter and tubing of the present invention can themselves be sanitized by simple pumping of sanitizing solution through the system.

The controller of the present invention accepts control signals from any typical digital control system or computer control device.

The vitamin delivery system of the present invention also eliminates the deleterious effects of pump and flow stream failures through the incorporation of a highly accurate flowmeter in the line between the pump and the vitamin injection point. Preferably, the flowmeter used is a magnetic flowtube or other type of flowmeter of a size which accommodates the extremely low flowrates at which the dairy concentrates are delivered. This flowtube is independently calibrated and provides a true independent record of vitamin delivered.

The vitamin delivery system of the present invention is also adapted to be connected by hardware to a remote chart recorder, distributed control system, and other typical instrumentation and control systems which can be used to totalize product flows and provide a hard copy record of volume actually pumped over a given period of time. With increasing government oversight, this feature helps the user to meet their record-keeping responsibilities.

SUMMARY OF THE INVENTION

The present invention provides an improved vitamin concentrate delivery system having a positive displacement pump including a pump head, a drive system to operate the pump head, and a controller to regulate the speed of the pump head. A flow measurement or detection unit monitors the flow from the pump, and a transmitter located with the detection unit provides data on the flow rates of the vitamin concentrate to a recording device and optionally to an alarm device. The recording device is adapted to make a permanent recording of the flow rate over time. Thus, the vitamin concentrate delivery system of the present invention may be combined with a computer to monitor the rate at which the vitamin concentrate is delivered to the milk or dairy products, or to stop and start the pump when no vitamins are needed in the product being processed.

BRIEF DESCRIPTION OF THE DRAWINGS

FIG. 1 is a flow diagram of the system of the present invention.

DETAILED DESCRIPTION OF THE PRESENTLY PREFERRED EMBODIMENTS

Referring to FIG. 1, a supply of vitamin concentrate is provided in a tank 10. The vitamin concentrate from tank 10 is fed through a supply pipe 12 to a pump 20. Pump 20 includes a positive displacement pump head 22. Pump head 22 is preferably a valveless piston metering pump which delivers a fixed volume of liquid with each stroke of the piston. A drive 24 is adapted to drive pump head 22 in order to create the pumping action. A controller 26 regulates the speed of drive 24 and thus controls the rate at which pump head 22 delivers the vitamin concentrate from pump 20.

The vitamin concentrate pumped from pump 20 is delivered through an output pipe 28 to a detection unit 30. Detection unit 30 preferably includes a magnetic flow tube 32, a transmitter 34, and a recording device 40. An alarm 42 may be associated with recording device 40. Magnetic flow tube 32 accurately measures the flow rate and volume of vitamin concentrate passing from pump 20 and transmits this information by transmitter 34 to recording device 40 and/or alarm 42. Recording device 40 preferably is an analog chart recorder, but other analog or digital recording devices may be used. Alarm 42 is designed to activate if the flow rates of the vitamin concentrate through magnetic flow tube 32 vary from a specified range.

The vitamin concentrate is output from detection unit 30 through a detector output pipe 36 and a check valve 38 into a mixing zone 52 where the vitamin concentrate is mixed into a stream of a dairy product, such as milk, passing through a conduit 50. The mixture of the vitamin concentrate and milk passes into a homogenizer 60, where the vitamin concentrate is thoroughly intermixed and incorporated into the dairy product.

Accordingly, the equipment set of an embodiment of the present invention includes a pump/controller, a flowmeter/transmitter, and a chart recorder. A remote control for the pump, whether from a foot switch, programmable controller, or other on/off control mechanism, may also be employed. The equipment set of this embodiment of the present invention offers the following advantages over prior systems.

The controller of the present invention enables the user to directly calibrate the pump and choose the desired flow rate.

The flowmeter provides an independent, calibrated verification of the amount of product pumped.

As the flow range for a vitamin delivery system is very low, generally between 4 and 20 mL/min, the most costly system component is the flowmeter. The primary variable and cost determinant between flowmeters is precision; meters which provide a precision of 0.5–1.0% are preferred, but also are the most costly. The preferred embodiment of the present invention balances the requirements for precision and cost minimization. The meter of the present invention preferably transmits flow information in the form of either a 0–5 VDC pulse signal or a 4–20 mA signal, standard input signal types for most data acquisition systems and chart recorders.

Another advantage of the equipment used in the present invention over the prior systems in that all system components, except the chart recorder, are impervious to equipment washdown, which is critical in the dairy plant environment.

Additionally, the piston pump of the present invention is capable of pumping against up to 150 psi as opposed to 30 psi for the prior art equipment.

A description of system components is shown below.

Pump

Preferably, the positive displacement pump is prefaced by a drive system, such as the Cole-Parmer Masterflex Modular L/S Digital Drive System, with a Fluid Metering, Inc. Series R valveless piston metering pump head. The maximum flow rate is 30 mL/min., and the pump is self-priming up to 15 feet. The maximum pressure is 150 psi. The controller comes built into a NEMA Type 13 (IP55) "wash-down" case, and includes a variable-speed NEMA Type 4X (IP56) "wash-down" motor.

Flowmeter

The detection unit is a flowmeter, preferably a Foxboro Magnetic Flowtube having a 0.0625" orifice diameter, a ceramic lining, a remote transmitter mounting, and a NEMA 4X (wash-down) housing. The flowtube is provided with a Foxboro Magnetic Flow Transmitter, which provides a 4–20 mA signal, and includes a 30 ft. signal cable. The flowmeter smooths/averages flow reading pulsation with internal damping circuitry.

Recorder

The preferred recording device is a continuous chart recorder such as a Honeywell DR4200 General Purpose 10" circular chart recorder, which measures in percent of maximum flow or in terms of actual flow.

EXAMPLES

The following are examples of use of the vitamin concentrate system of the present invention. These examples reflect the accuracy of the system of the present invention. More specifically, the examples show the uniformity of vitamin fortification with the system of the present invention.

Example 1
Flow rate measurement for Vitamin D Concentrate 100 mL of Vitamin D Concentrate VI-DEE "250,000" made by Vitamins, Inc. containing 200,000 I.U. per ml of Vitamin D2 was diluted in 1500 cc of water. The pump was set to 15 mL/min. The pump was then run for 16 minutes. The following data was obtained:

| Flowmeter indicator: | 14 to 15 mL/minute |
| --- | --- |
| Totalizer Reading: | 15 mL/min |
| | 243 ml for 16 minutes |
| Actual volume delivered: | 240 ml for 16 minutes |
| Chart Recorder: | 20% of full scale (14 mL/min; full scale is 70 mL/min) |

Example 2
Flow rate measurement for Vitamin A & D Concentrate 200 mL of Vitamin A & D Concentrate VI-ADE 3 "150,000" made by Vitamins, Inc. containing 200,000 I.U. per ml of Vitamin A and 50,000 I.U. per ml of Vitamin D3 were diluted in 400 mL of water. The pump was set to 15 mL/min. The pump was then run for 8 minutes. The following data was obtained:

| Flowmeter indicator: | 15 mL/minute |
| --- | --- |
| Totalizer Reading: | 15 mL/min |
| | 121 ml for 8 minutes |
| Actual volume delivered: | 120 ml for 8 minutes |
| | 15 mL/min |
| Chart Recorder: | 20% of full scale (14 mL/min; full scale is 70 mL/min) |

Example 3
Fortification of whole milk with Vitamin D3

250 mL of Vitamin D3 Concentrate VI-DEE 3 "250,000" made by Vitamins, Inc. containing 200,000 I.U. per ml was diluted in 3780 mL of water. The pump was set to 15 mL/minute. The pump was then run for 57 minutes to deliver the vitamins into the whole milk stream. The following data was obtained:

| Flowmeter indicator: | 14 to 15 mL/minute |
| --- | --- |
| Totalizer Reading: | 15 mL/min |
| | 857 ml for 57 minutes |
| | (15.03 mL/min) |
| Chart Recorder: | 21 +/− 6% of full scale (full scale is 70 mL/min) |

Example 4
Flow rate measurement for Vitamin A and D3 Concentrate 250 mL of VI-ADE 3 "50,000" made by Vitamins, Inc. containing 200,000 I.U. per ml and 50,00 I.U. per ml of Vitamin D3 was diluted in 4000 mL of water. The pump was set to 15 mL/minute. The pump was then run for 20 minutes, shut off for 25 minutes, and restarted for 70 minutes. The following data was obtained:

| Flowmeter indicator: | 15 mL/minute |
| --- | --- |
| Totalizer Reading: | 15 mL/min while running |
| | 1.37 liters for 90 minutes |
| | (15.2 mL/min) |
| Chart Recorder: | 20 +/− 2% of full scale (full scale is 70 mL/min) |

Example 5
Comparison of Vitamin A and D3 Fortification of Fluid Milk by Prior Method and Method and System of Present Invention Four types of fluid milk products, namely 2%, 1%, 0.5%, and skim milk were fortified with vitamins A and D3 under commercial conditions at a dairy utilizing an prior art existing pumping system, and the system of the present invention. After fortification, samples were analyzed for Vitamin A and Vitamin D3 content of milk. The results were as follows:

| | Old Pump and System Iu/qt | | New Pump and System of Present Invention Iu/qt | |
| --- | --- | --- | --- | --- |
| Product | Vitamin A (Target 2000) | Vitamin D (Target 400) | Vitamin A (Target 2000) | Vitamin D (Target 400) |
| Homogenized | N/A (no vitamins added) | N/A (no vitamins added) | (not tested) | (not tested) |
| 2% | 3480 | 589 | 2590 | 440 |
| 1% | 2960 | 568 | 2700 | 470 |
| .5% | 2810 | 555 | 2340 | 459 |
| skim | 2510 | 519 | 2010 | 451 |
| mean | 2940 | 557 | 2410 | 455 |
| S.D. | 406 | 29.4 | 306 | 12.7 |

Results show that the system of the present invention delivers vitamins close to the target values (i.e. mean is lower (less overage)) and provides more consistent delivery compared to prior art (i.e. S.D. is lower (more consistent)).

The forms of invention shown and described herein should be considered only as illustrative. It will be apparent to those skilled in the art that numerous modifications may be made therein without departing from the scope of the invention or the scope of the appended claims.

We claim:

1. A method of adding vitamin concentrates to a liquid diary product, said method comprising the steps of:
   providing a supply of vitamin concentrates to a positive displacement pump;
   pumping said vitamin concentrates from said pump to a detection unit;
   accurately measuring with said detection unit the flow rate and volume of vitamin concentrates pumped from said pump;
   regulating the speed of said pump and the flow rate at which said pump pumps said vitamin concentrates; and
   adding said vitamin concentrate to said liquid diary product at a specific flow rate.

2. The method of claim 1 further comprising the step of recording the flow rate at which said pump pumps said vitamin concentrate.

3. The method of claim 1 further comprising the step of activating an alarm if said flow of vitamin concentrate varies from a specified range.

* * * * *

UNITED STATES PATENT AND TRADEMARK OFFICE
CERTIFICATE OF CORRECTION

PATENT NO. : 5,786,012
DATED : July 28, 1998
INVENTOR(S) : Erik G. PETERSON

It is certified that error appears in the above-identified patent and that said Letters Patent is hereby corrected as shown below:

On the cover page in the title, change "DIARY", TO --DAIRY--;

Column 1, Line 2, change "DIARY", to --DAIRY--;

Column 1, Line 27, change "diary", to --dairy--;

Column 6, Line 48, change "diary", to --dairy--;

Column 6, Line 58, change "diary", to --dairy--.

Signed and Sealed this

Fifteenth Day of December, 1998

Attest:

BRUCE LEHMAN

Attesting Officer

Commissioner of Patents and Trademarks